United States Patent
Hoffmann

(10) Patent No.: US 9,644,958 B2
(45) Date of Patent: May 9, 2017

(54) METHOD FOR THE VALIDATION OF SOLAR ALTITUDE-DEPENDENT MEASURED VALUES OF SEVERAL MEASUREMENT CHANNELS

(71) Applicant: skytron energy GmbH, Berlin (DE)

(72) Inventor: Hendrik Hoffmann, Zeuthen (DE)

(73) Assignee: SKYTRON ENERGY GMBH, Berlin (DE)

( * ) Notice: Subject to any disclaimer, the term of this patent is extended or adjusted under 35 U.S.C. 154(b) by 869 days.

(21) Appl. No.: 13/846,096

(22) Filed: Mar. 18, 2013

(65) Prior Publication Data

US 2013/0319077 A1 Dec. 5, 2013

(30) Foreign Application Priority Data

Mar. 18, 2012 (EP) .................................... 12168530

(51) Int. Cl.
*G06F 11/30* (2006.01)
*G01B 21/04* (2006.01)
*H02S 50/10* (2014.01)

(52) U.S. Cl.
CPC ............ *G01B 21/042* (2013.01); *H02S 50/10* (2014.12)

(58) Field of Classification Search
CPC .............................. G01B 21/042; H02S 50/10
(Continued)

(56) References Cited

U.S. PATENT DOCUMENTS 8,299,416 B2 * 10/2012 Arbore .................. G01N 21/55
250/222.2
8,725,437 B2 * 5/2014 Caine ...................... H02S 50/10
702/58
(Continued)

FOREIGN PATENT DOCUMENTS

EP 0 677 749 A2 10/1995
EP 2 293 089 A1 3/2011
(Continued)

OTHER PUBLICATIONS

A Firth S K et al: "A simple model of PV system performance and its use in fault detection", in: Solar Energy, Pergamon Press. Oxford, GB, Bd. 84, Nr. 4, Apr. 1, 2010, pp. 624-635.

Primary Examiner — Jonathan C Teixeira Moffat
Assistant Examiner — Xiuquin Sun
(74) Attorney, Agent, or Firm — MacMillan, Sobanski & Todd, LLC

(57) ABSTRACT

Validation of solar altitude-dependent measured values of several measurement channels. Measured values of the measurement channels that take the solar altitude into consideration are stored. Stored ratios of the stored measured values for all solar altitudes are calculated and stored. An expected ratio is determined by calculation of a frequency distribution over all stored ratios A current ratio of a currently measured measured value to the current measured values of the other measurement channels are calculated The currently measured measured values are validated. If the expected ratio corresponds to the stored ratio and the stored ratio corresponds to the currently ratio, the current measured value is valid. If the expected ratio corresponds to the stored ratio and the stored ratio deviates from the current ratio, a disturbance is present. If the expected ratio deviates from the (Continued)

stored ratio, the validity for this measured value is not evaluated.

20 Claims, 6 Drawing Sheets

(58) Field of Classification Search
USPC .......................................................... 702/183
See application file for complete search history.

(56) References Cited

U.S. PATENT DOCUMENTS

| | | | |
|---|---|---|---|
| 8,736,825 B2* | 5/2014 | Ciocan | G01N 21/31 |
| | | | 356/445 |
| 2011/0241720 A1 | 10/2011 | Beck | |
| 2012/0084027 A1 | 4/2012 | Caine | |
| 2012/0197557 A1 | 8/2012 | Bettenwort et al. | |
| 2013/0124122 A1* | 5/2013 | Cook | H02S 50/10 |
| | | | 702/64 |

FOREIGN PATENT DOCUMENTS

| | | |
|---|---|---|
| EP | 2 317 329 A2 | 5/2011 |
| JP | 2005 340464 A2 | 12/2005 |

* cited by examiner $$\text{Ratio}_{\text{Measurement channel } j} = \frac{n \times \text{Instantaneous value}_{\text{Measurement channel } j}}{\sum_{i=1}^{n} \text{Instantaneous value}_{\text{Measurement channel } i}}$$

METHOD FOR THE VALIDATION OF SOLAR ALTITUDE-DEPENDENT MEASURED VALUES OF SEVERAL MEASUREMENT CHANNELS

CROSS REFERENCE TO RELATED APPLICATIONS

The present application claims priority to European Patent Application EP 12168530.9, filed Mar. 18, 2012, which is incorporated herein by reference in its entirety.

FIELD OF THE INVENTION

The invention is directed at a method for validating solar altitude-dependent measured values of several measurement channels, especially measured values from photovoltaic systems.

BACKGROUND AND INTRODUCTION TO THE INVENTION

In PV (photovoltaic) power plants, different parameters are measured, recorded and evaluated at different levels for status monitoring. These parameters include especially the current and power of individual strings, the power of individual zones, which corresponds to the combination of strings, the power of individual inverters, which corresponds to the combination of zones or strings, as well as the power of individual power plant units, which corresponds to the combination of inverters.

The monitoring shows that a high number of erroneous detections can occur, since the cause of the deviation is not always due to the tested component itself. Signal fluctuations from scheduled maintenance, network management, it being overcast and partial light obstructions are some of the significant causes for erroneous detection. Since scheduled maintenance and network management can be solved on an organizational level, they are not further discussed here. Fluctuations caused by overcast skyes can, due to their time dependent behavior, be simply recognized and compensated by evaluating the consistency of the measured signal and averaging. Thus, what is considered are, in particular partial light obstructions.

Partial light obstructions are caused by stationary objects in the vicinity of the PV installation, like buildings, trees, wind rotors or high voltage towers and therefore occur at regular intervals. The partial light obstructions concern the individual elements of the group, like strings or individual modules, but with different intensity at different times.

Recognition of partial light obstructions and especially distinguishing them from incorrect function is complex. A promising approach does not yet exist. Patent applications, patents and other material referred herein are incorporated herein by reference in their entirety.

US 2012/0197557 (EP 2 293 089 A1) discloses a string failure monitoring in which the currents passing through the strings are measured, standardized by means of a reference current and then analyzed. The analysis is standardized over time and occurs at the end of the day.

US 2012/084027 shows monitoring of the power of a PV power plant based on measured data of the strings. Failure and degradation can be better recognized by using monitoring conditions, power limit values and self-calibration.

US 2011/0241720 (EP 0 677 749 A2) discloses recognition of an anomaly in a PV power plant in which the electrical parameters of the strings are measured and mutually compared. Based on the result of comparison a warning unit issues a warning during an anomaly.

Thus, there is a need for improving processing of solar altitude-dependent measured values.

This need and other needs are addressed via the method and features disclosed and/or claimed herein.

SUMMARY OF THE INVENTION

A first aspect of the invention concerns a method for validation or processing of solar altitude-dependent measured values of several measurement channels comprising the following:

Storage of at least maximal values of the measured values of the measurement channels under consideration of the corresponding solar altitude;

Calculation and storage of stored ratios so that the ratio to the measured values of other measurement channels is formed for the measured values of each measurement channel for each solar altitude;

Determination of an expected ratio by calculating a frequency distribution over all stored ratios;

Calculation of an current ratio of an currently measured measured value to the current measured values of other measurement channels; and Validation of the currently measured measured values;

If the expected ratio corresponds to the stored ratio and the stored ratio corresponds to the current ratio, the current measured value is valid; and/or If the expected ratio corresponds to the stored ratio and the stored ratio deviates from the current ratio, a disturbance is present; and/or If the expected ratio deviates from the stored ratio, the validity for this measured value is not evaluated.

One characteristic of the solar altitude-dependent measured values is their proportionality to the present solar radiation; the proportionality can be a fixed, determinable factor or a complex dependence. This characteristic can be utilized to check several measured values of different measurement channels of the same type relative to each other and thus detect and report errors or component failures. Checking of the values relative to each other saves comparison with a reference sensor, like a radiation sensor, and thus leads to higher robustness towards sensor failures, calibration errors, alignment errors, parameter deviations, etc.

The method can resort to further assumptions: incorrect functions often occur permanently from a specified time or are present sporadically and irregularly. They affect an individual element of the group, generally always in the same way. It can also be assumed that each component, like a solar module, is arranged so that there is no light obstruction during most of the year or at least the maximum percentage of light obstruction can be specified.

The method uses these characteristics to suppress incorrect detections or incorrect alarms with its algorithm. For this purpose light obstructions or partial light obstructions are recognized, namely when the expected ratio deviates from the stored ratio. A method executed by a controlling or a monitoring computer that would recognize an error, can then be relied upon or influenced to suppress this error. This substantially improves operation of a PV power plant, since a number of incorrect alarms are suppressed. The method can be executed as a routine or component of a power plant control and/or monitoring program.

The measured values can be stored in a matrix at the position corresponding to their solar altitude. For example, only the absolute maximal values per position can then be recorded. One matrix or memory structure per measurement channel can be provided. The measured values can be filtered and/or smoothed before or after storage.

The stored ratios are formed due to the fact that the ratio to the measured values of other measurement channels is formed for the measured values of each measurement channel for each solar altitude.

For example, from the memory structures of the measured values of the measurement channels, the ratios of the measured values to each other can now be calculated for all solar altitudes. Assuming that each measurement channel is not light obstructed for the most part, an expected ratio can be determined by determining the frequency distribution in the ratio memory structure. In the undisturbed case, i.e., when no light obstruction or the like is present, the expected ratio (relative) is constant. The expected ratio can be chosen as the extreme value of the frequency distribution.

The above steps are preferably conducted repeatedly, in which case matrices, vectors and/or additional memory structures for the measured values are filled and the maximal or minimal values compared and optionally replaced.

The current ratio is now calculated from the current measured values and the current measured value the validated. Validation includes different comparisons. Direct agreement or a comparison can then be made and evaluated, respectively or a deviation by more than a limiting value can be considered.

If the value of a measurement channel deviates from the other values of the group, i.e., the corresponding values of other channels or significantly deviates, an incorrect function could be present. If it is now apparent from comparison of the most frequent ratio of this measured value with the value stored for the instantaneous solar altitude that no deviation would be expected here, an error or disturbance is present.

If the expected ratio deviates from the stored ratio, the validity is not evaluated for this measured value. No check is needed, since light obstruction is present in this case.

One or more measured values can be checked for plausibility. The measured values can be checked for plausibility before or also during processing. For this purpose the signal monotonic characteristic can be evaluated, among other things, to recognize measurement errors and known variables, like scheduled maintenance or specifications and/or effects of network management, the current error status and historical data, like previous measurements at the same solar altitude, are considered.

The measurement channels can be assigned to strings of a photovoltaic installation and the measured values can result from measurement of string currents of the strings. During light obstruction or partial light obstruction of photovoltaic systems it is often not obvious for the operator or the control of the installation whether an error or only a light obstruction occurred. From the generated error message the operator does not know whether a real error or only light obstruction caused it. The method therefore is of interest for photovoltaic systems. Not only individual strings, but also zones, inverters and power plant units can be monitored and processed.

Light obstruction of a string for a specified solar altitude range can be present, if the stored ratio for this range deviates from the expected ratio. If light obstruction is recognized, an error message generated by the installation or status control can be suppressed or the generation and/or issuing of an error message can be suppressed or prevented.

The method allows for the storage of maximal values of the measured values. This permits training or self-learning of the method, since the stored measured values are continuously compared with the current values and also replaced with new maximal values, i.e., they are adjusted.

Calculation of the current ratio can include a comparison of the current measured value with a target value or threshold value. The target value or threshold value can be a fixed value, like a specific current value in amperes or a limiting value for a measured value for the current and/or other measurement channels. Calculation of the current ratio can contain one or more such comparisons or can consist exclusively of them.

To determine the expected ratio a selection of stored values can be used as support locations. For example, several values per solar altitude can already be stored for the individual measured values. This can be used to map more complex dependencies of the measured channels of a group relative to each other. The term group includes several measured values of the same type.

The input quantities of the method can be the measured values and the corresponding measurement times. The solar altitude can be derived or calculated via the time and known location or geocoordinates of the measurement point, like a solar panel, a generator connection box, an inverter or the like. The solar altitude or solar position is ordinarily provided in terms of altitude and azimuth.

The expected ratio might not be determined, if a sufficient number of stored measured values is not available. It can happen in still incompletely or only partially filled storage structures that the method still does not reach its full performance capability. The method can then be modified in order to not characterize true errors inadvertently as light obstruction. The filling state or filling states of the storage structures can be used as criterion for modified application. With insufficient filling status the expected ratio can still be indistinct and comparison cannot be conducted.

In another aspect the invention is directed toward a method for operating a photovoltaic power plant with error monitoring, in which detected errors are checked with the method described above and error messages are suppressed in the presence of light obstruction. The same advantages and modifications as described above apply.

In particular, the present invention is directed at a method for validation of solar altitude dependent measured values of several measurement channels (3) comprising:

storing (100) of at least maximal values of the measured values of the measurement channels (3) taking into consideration the corresponding solar altitude;

calculating and storing (200) of stored ratios (201) so that, for the measured values of each measurement channel for each solar altitude, the ratio to the measured values of the other measurement channels (3) is formed;

determining (300) an expected ratio (301) by calculating a frequency distribution over all stored ratios (201);

calculating (400) a current ratio of a currently measured measured value to the currently measured values of the other measurement channels (3); and validating (5) the currently measured measured values;

If the expected ratio (301) corresponds to the stored ratio (201) and the stored ratio (201) corresponds to the current ratio, the currently measured value is valid (506); and/or If the expected ratio (301) corresponds to the stored ratio (201) and the stored ratio (201) deviates from the current ratio, a disturbance is present (505); and/or If the expected ratio (301) deviates from the stored ratio (201), the validity for this measured value is not evaluated (503).

A measured value may be checked for plausibility. The measurement channels (3) may be assigned to strings of a photovoltaic system (1) and the measured values may result from measurements of the string currents of strings (3). Light obstruction of a string (3) may be present for a certain solar altitude range if the stored ratio (201) for this range deviates from the expected ratio (301). The calculating of the current ratio may include comparing the currently measured value with a target value or threshold value. For determining the expected ratio a selection of stored measured values may be used as reference points. The input quantities may be (a) the measured values and (b) the corresponding times at which the measurements were taken.

The invention is also directed at a method for operating a photovoltaic power plant (1) with error monitoring, comprising:

checking detected errors via the method according to at least one of the methods described herein, and suppressing error messages in the presence of light obstruction.

BRIEF DESCRIPTION OF THE FIGURES

The invention is further described with reference to the drawings below in which:

FIG. 5 shows a schematic depiction of a fourth step of the method according to the invention.

The drawing serves merely for explanation of the invention and does not restrict it. The drawings and the individual parts are not necessarily to scale. The same reference numbers denote identical or similar parts.

DESCRIPTION OF VARIOUS AND PREFERRED EMBODIMENTS OF THE INVENTION

Figure 1:
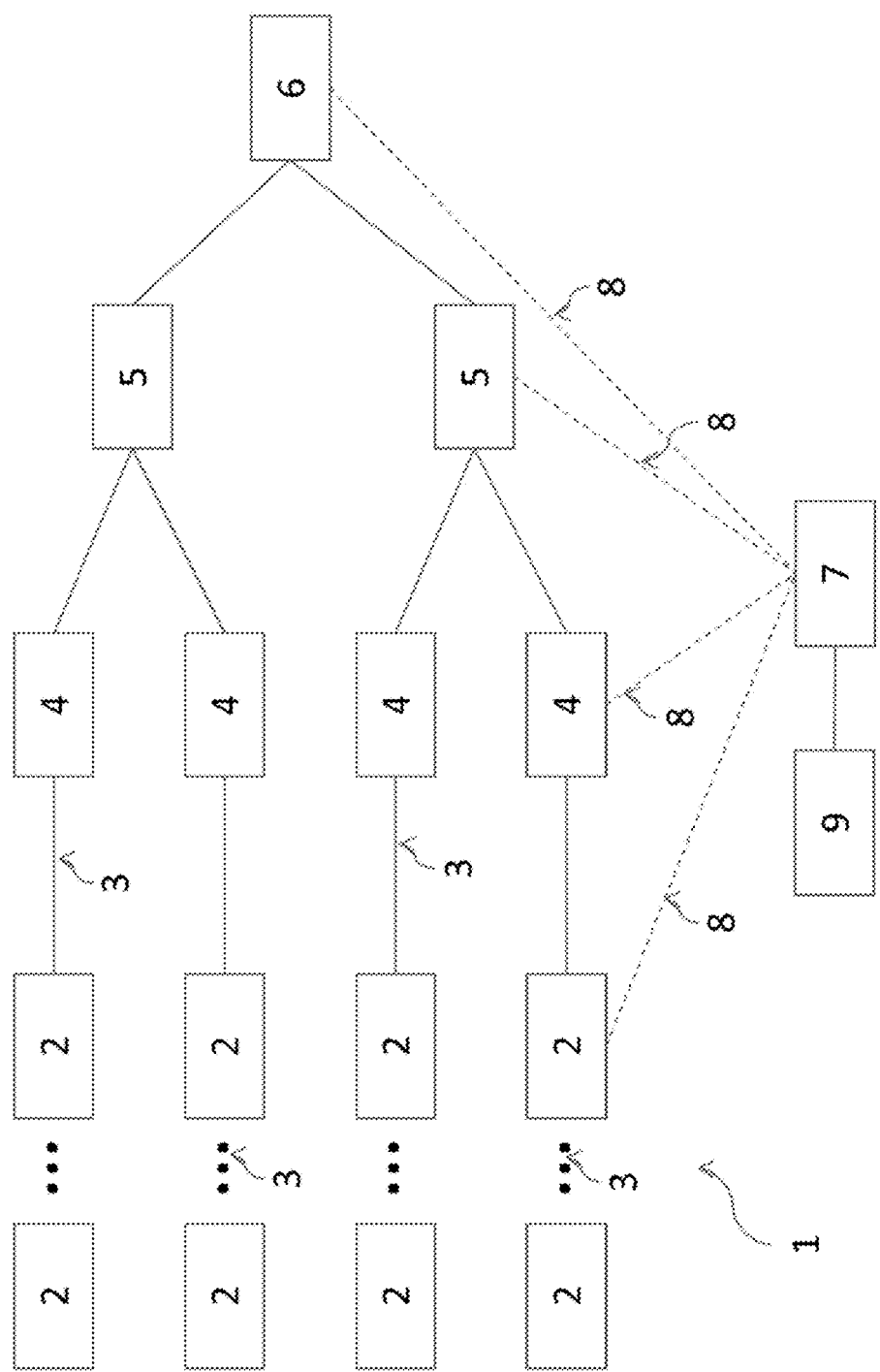
FIG. 1 shows a schematic depiction of a PV power plant according to the invention.

FIG. 1 shows a photovoltaic power plant 1 with several solar modules 2. The solar modules 2 are arranged in strings 3. For this purpose several solar modules 2 are connected in succession. Several strings 3 can be combined logically and/or by circuitry into zones.

Each string 3 leads to a generator connection box 4 or similar connection point for string 3. A string 3 is assigned here to each generator connection box 4 and several strings 3 can also be connected to one generator connection box 4. The generator connection box 4 need not be an independent unit, but can also be a component, like a circuit board, module or software routine for signal processing, another electrical and/or electronic unit.

The generator connection boxes 4 are connected to inverters or current rectifiers 5. The inverters 5 convert the direct current generated by the solar modules 2 to alternating current. Two generator connection boxes 4 are connected here to an inverter 5. This ratio can be chosen differently depending on the installation, the employed components, etc.

The inverters 5 are combined to a power plant unit 6 and/or are connected to a grid transfer point 6. The grid transfer point 6 is connected on the output side to the power grid.

The connections explained above between solar modules 2, generator connection boxes 4, inverters 5 and/or grid transfer point 6 are primarily connections for transfer of energy. Moreover, information can be transmitted via these connections and/or additional connections. This information can be explicit information, like control data, operating data, etc. or implicit information, which is contained in the energy transmission and is extracted.

A control or computer unit 7 accepts the measured values of the measurement channels 3. The measured values are fed to the control unit 7 via signal lines 8. Several signal lines to the solar modules 2, generator connection boxes 4, inverters 5 and grid transfer points 6 are shown in FIG. 1. Additional signal lines to the other solar modules 2, generator connection boxes 3 and inverters 5 are not shown for reasons of clarity. Merely a single type of signal line, for example, to the generator connection boxes 4, can also be used.

The control unit 7 processes and validates the measured values as a function of solar altitude. A power plant control 9, which monitors and controls operating processes of the photovoltaic power plant 1 is connected to the control unit 7 so that measured values, information, results and additional data can be exchanged. Control unit 7 can be designed as a component of the power plant control 9 in hardware and/or software.

A process of the method for validation of measured values and for (status) monitoring with PV power plant is described below with reference to FIGS. 2 to 6.

Figure 2:
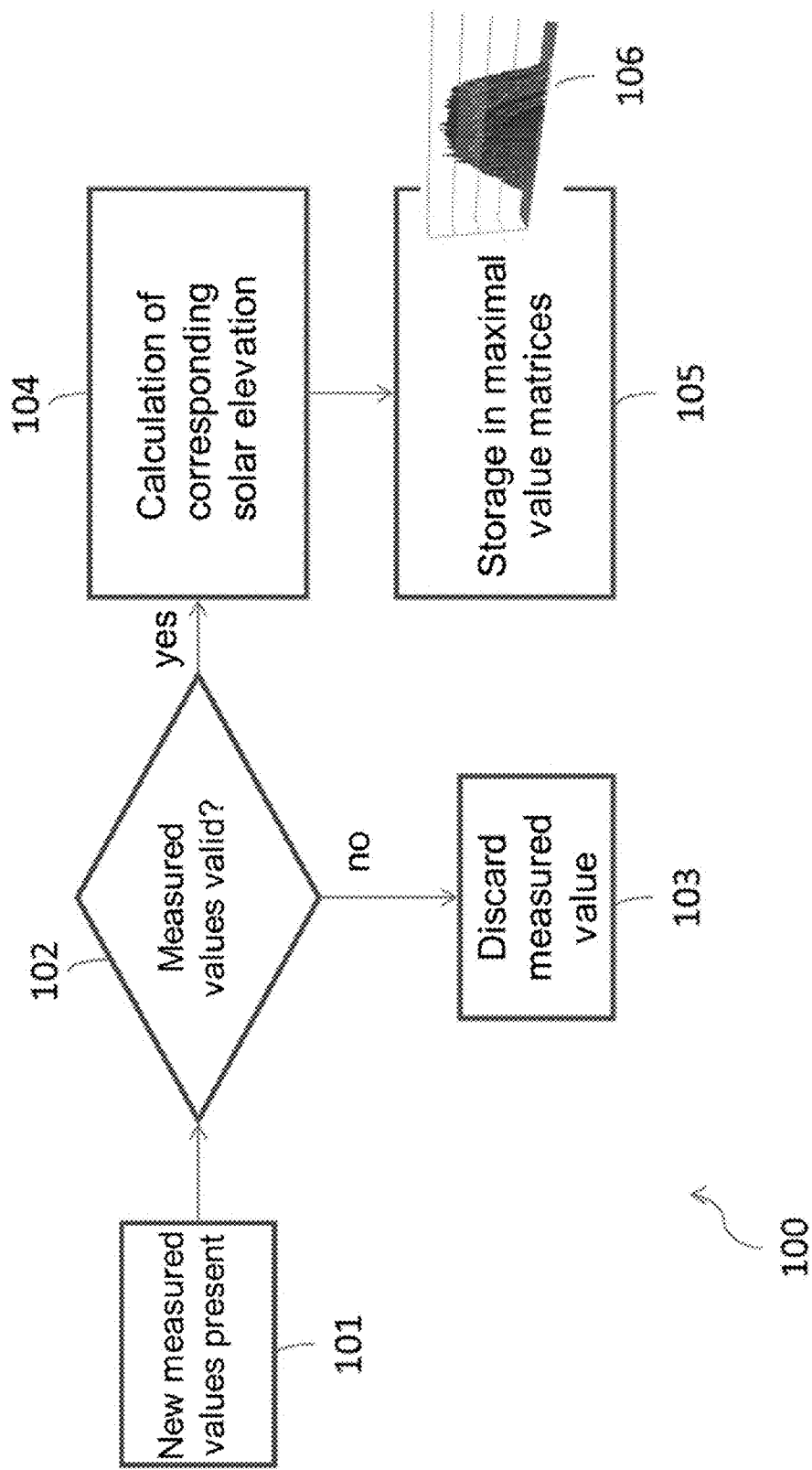
FIG. 2 shows a schematic depiction of a first step of the method according to the invention.

FIG. 2 shows a first step 100 in which measured values of the measurement channels 3 are stored with consideration of solar altitude. New measured values are initially available in a first partial step 101. If this is not the case, the method and/or the necessary hardware and software can be in a standby operation. In the step or block 102 the validity of the measured value or values is optionally checked. If the measured value is invalid, for example because a measurement error is detected or implausibility is present because of reported maintenance, the measured value is discarded in step 103. For later processing, documentation and/or evaluation the discarded measured value can be secured.

If the measured value is valid or plausible, the solar altitude corresponding to the measured value is calculated in step 104. The solar altitude is calculated via the time of the measured value and the known location of measured apparatus or area. The solar altitude is determined in elevation and azimuth.

The measured value is stored in step 105 with consideration of the solar altitude in a maximal value matrix 106. This matrix 106 stores the measured values, like string currents, together with location and/or datum information or coordinates. Measured values for each string and for each solar position or each solar altitude are stored.

Maximal values are stored in each case, i.e., for each data field of the matrix. For the chosen time cycle, for example, year, month, week or day, a new plausible measured value is only stored in matrix 106 if it has a higher or large value than the measured value already existing for this time. Selection of the maximal value provides good correlation with the desired output maximization of the PV unit 1.

Figure 3:
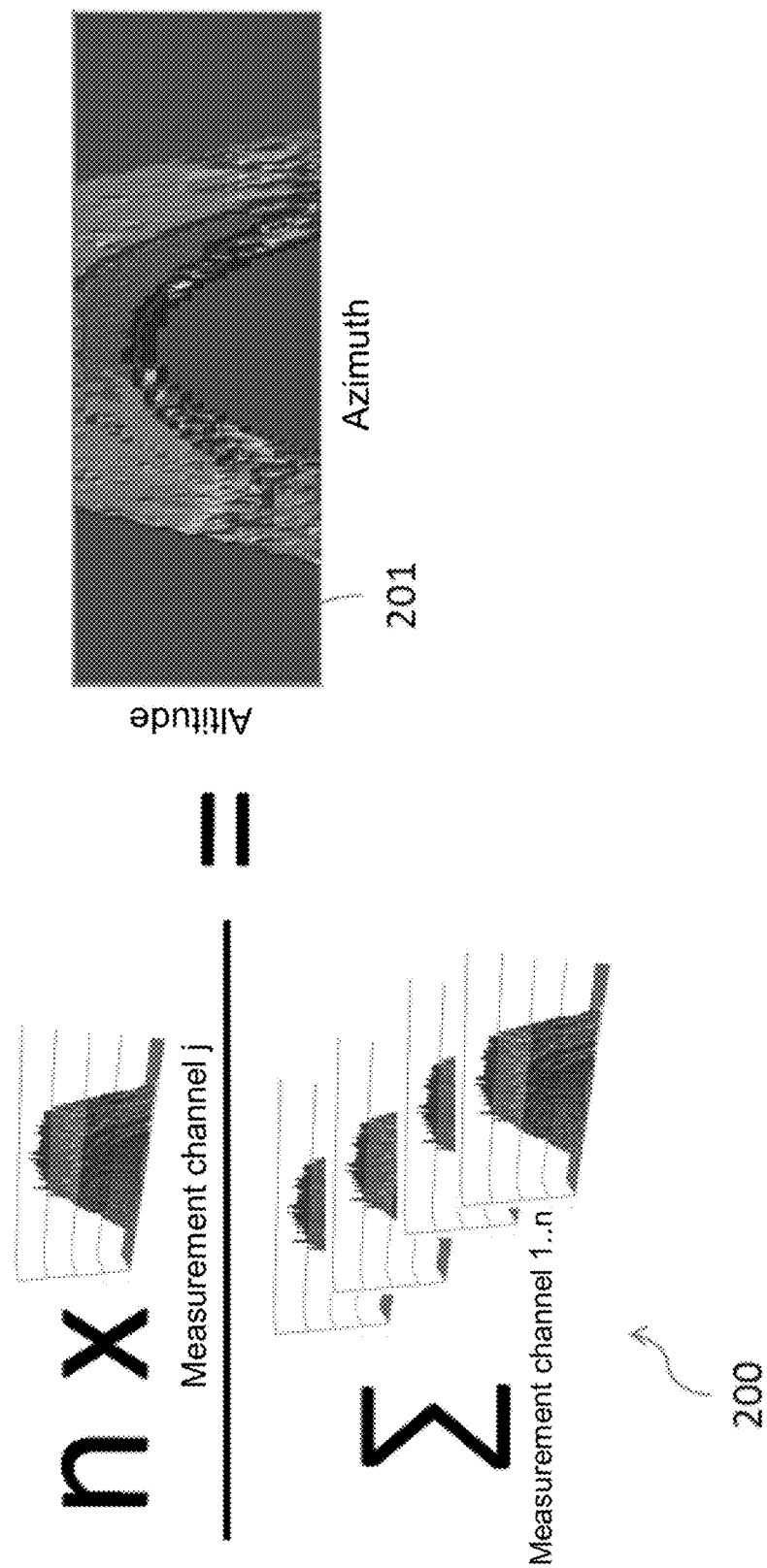
FIG. 3 shows a schematic depiction of a second step of the method according to the invention.

FIG. 3 shows a second step 200 in which ratios stored for all solar altitudes are calculated from the measured values in step 100 and stored. For this purpose the n-fold value of each stored measured value of a measurement channel j is divided by the sum of the corresponding 1 . . . n measured values of all corresponding measurement channels 3. This calculation is conducted for all measurement channels 3. The result for each measurement channel 3 is a ratio matrix 201, with a dimension for the measured value of the ratio, a dimension for the elevation and a dimension for the azimuth. It can be stated that the ratio matrix 201 reflects experience values.

Figure 4:
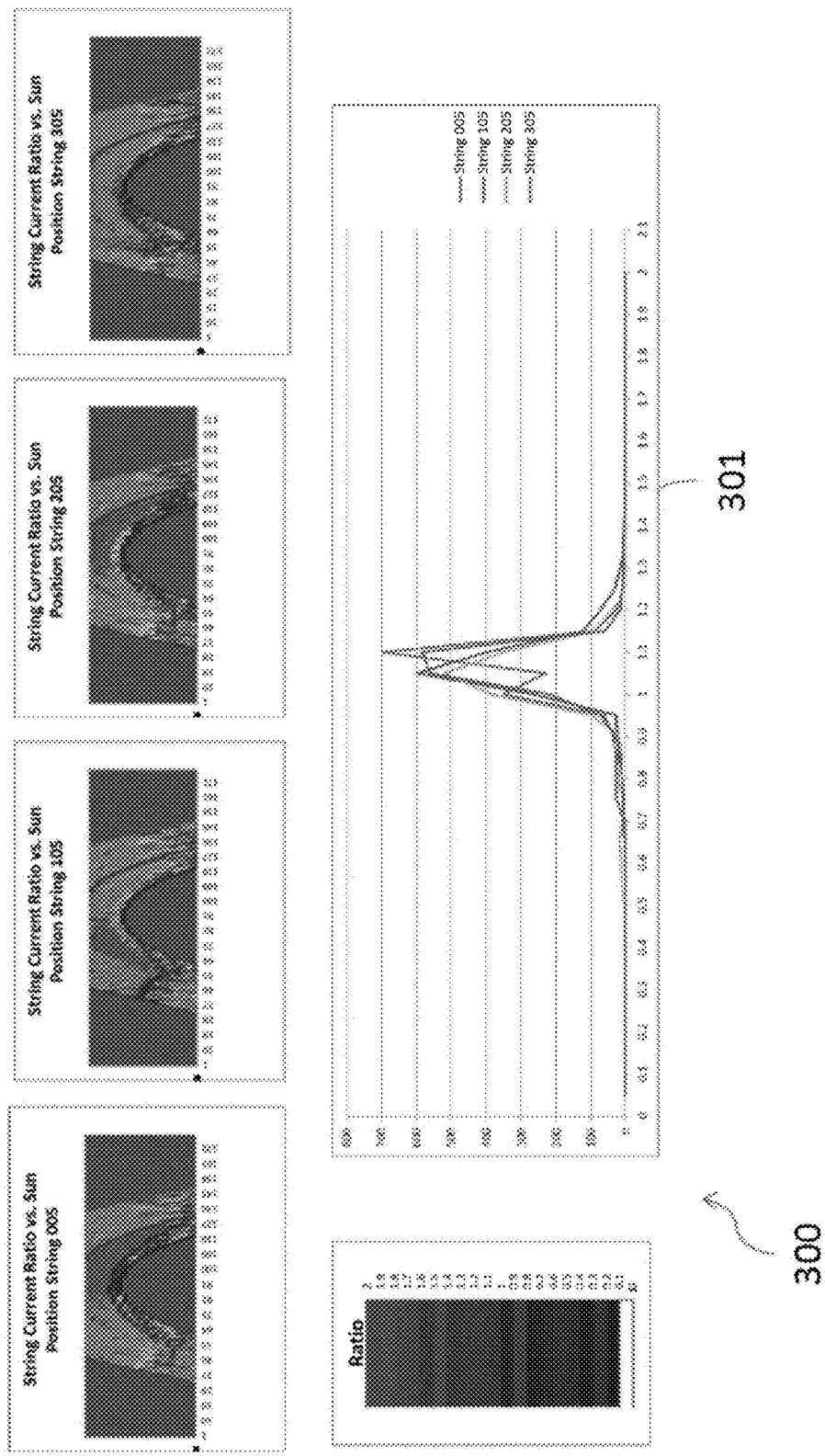
FIG. 4 shows a schematic depiction of a third step of the method according to the invention.

FIG. 4 shows a third step 300 for determination of an expected ratio 301 by calculation of a frequency distribution over all stored ratios for the second step 200. For example, four strings 005, 105, 205 and 305 are considered here. For each string 3 an expected ratio 301 is calculated. As shown, the ratios are similar or of a similar order of magnitude when the strings are unshaded. The extreme values of the frequency distributions are the expected ratios.

FIG. 5 shows a fourth step 400 for calculation of an current ratio of an currently measured measure value or instantaneous value of the current measured value of the other measurement channels. For this purpose an currently measured measured value or an instantaneous value of the measurement channel j is divided by the sum of all corresponding current measured values or instantaneous values.

Figure 6:
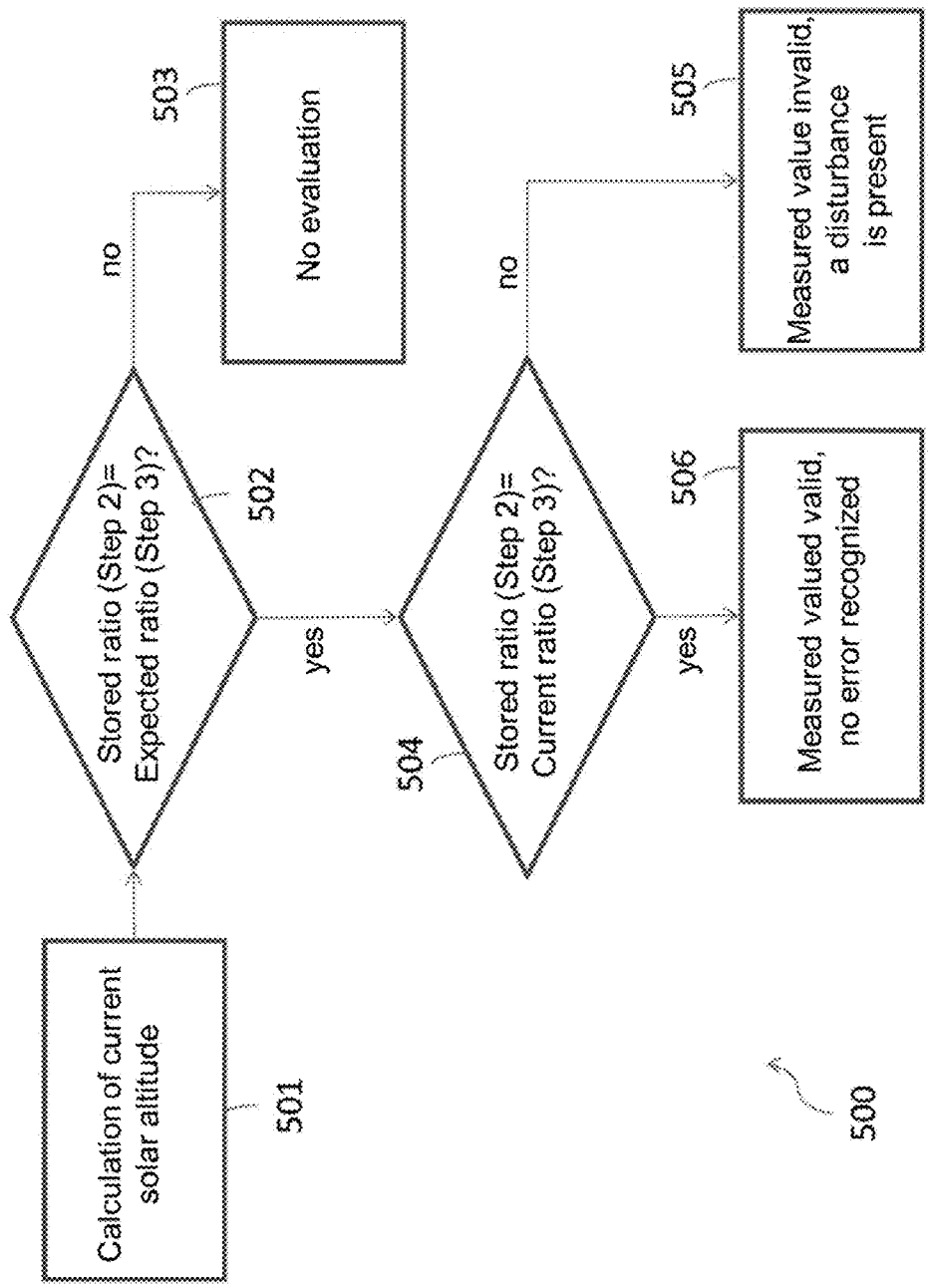
FIG. 6 shows a schematic depiction of a fifth step of the method according to the invention.

FIG. 6 shows a fifth step 500 for validation of an currently measured measured value. In the first four steps 100, 200, 300 and 400 the basis for the fifth step 500 is laid. The calculations there can occur continuously preferably with new measured values in the background. In the fifth step the current measured values processed are validated.

In a partial step 501 the current solar altitude is calculated. It is then checked in step 502 whether the expected ratio from step 300 deviates from the stored ratio from step 200. If no deviation is present, the validity for this measured value is not evaluated in step 503. In this case light obstruction is present and an error message of the power plant control 9 generated for this case of light obstruction can be suppressed and/or modified.

If a deviation is present in step 502, it is checked in step 504 whether the stored ratio from step 200 corresponds to the current ratio from step 400. If this is not the case, a disturbance is present according to step 505. If no deviation is present, the current measured value is valid according to step 505.

Both comparisons 502 and 504 are conducted for the presence of the results of steps 505 and 506. The two comparison can be conducted simultaneously or in parallel or in a different sequence.

The method described above is one of several variants. Individual steps, like plausibility checking, are optional. The sequence of steps can also be chosen differently, if steps can also possibly be conducted in parallel or one step can be implicitly executed in another step.

I claim:

1. Method for validating solar altitude dependent measured values of several measurement channels comprising:
    storing at least maximal values of the measured values of the measurement channels taking into consideration a corresponding solar altitude;
    calculating and storing stored ratios, wherein each of the stored ratios is a ratio of a first value of the measured values of each measurement channel for each solar altitude to a sum of second measured values of other measurement channels;
    determining an expected ratio by calculating a frequency distribution over all of the stored ratios;
    calculating a current ratio of a first currently measured value for a corresponding measurement channel to second currently measured values of the other corresponding measurement channels;
    validating the first currently measured value, wherein
        if the expected ratio corresponds to the stored ratio and the stored ratio corresponds to the current ratio, the first currently measured value is valid,
        an error is not detected, and an error message for a photovoltaic power plant is not generated, wherein the photovoltaic power plant has strings of solar modules assigned to the measurement channels; and/or
        if the expected ratio corresponds to the stored ratio and the stored ratio deviates from the current ratio, a disturbance is present, and the error message is generated indicating a disturbance or a light obstruction of the photovoltaic power plant; and/or
        if the expected ratio deviates from the stored ratio, validity for the first currently measured value is not evaluated, a temporary light obstruction of the photovoltaic power plant is detected and the error message is suppressed;
    in which the measured values, first currently measured value, and second currently measured values result from measurements of the photovoltaic power plant; and
    wherein the photovoltaic power plant comprises
        a generator connection box for the strings;
        an inverter connected to the generator connection box;
        a grid transfer point connected to the inverter;
        a computer unit accepting the measured values of the measurement channels and validating the first currently measured value;
        signal lines connecting the solar modules, generator connection box, inverter, grid transfer point, and computer unit, wherein the signal lines feed the measured values to the computer unit; and
        a power plant control monitoring operation of the photovoltaic power plant, wherein the power plant control is connected to the computer unit to exchange the measured values.

2. Method according to claim 1, in which the measured values are checked for plausibility.

3. Method according to claim 2, in which the measured values result from measurements of the string currents of the strings.

4. Method according to claim 3, in which the temporary light obstruction of a certain string is present for a certain solar altitude range if the stored ratio for this range deviates from the expected ratio.

5. Method according to claim 2, in which the calculating of the current ratio includes comparing the first currently measured value with a target value or threshold value.

6. Method according to claim 2, in which for determining the expected ratio a selection of the at least maximal values of the measured values, that have been stored, are used as reference points.

7. Method according to claim 2, in which input quantities are (a) the measured values and (b) the corresponding times at which the measurements were taken.

8. Method according to claim 1, in which the measured values result from measurements of the string currents of the strings.

9. Method according to claim 8, in which the temporary light obstruction of a certain string is present for a certain solar altitude range if the stored ratio for this range deviates from the expected ratio.

10. Method according to claim 8, in which for determining the expected ratio a selection of the at least maximal values of the measured values, that have been stored, are used as reference points.

11. Method according to claim 8, in which input quantities are (a) the measured values and (b) the corresponding times at which the measurements were taken.

12. Method according to claim 1, in which the calculating of the current ratio includes comparing the first currently measured value with a target value or threshold value.

13. Method according to claim 1, in which for determining the expected ratio a selection of the at least maximal values of the measured values, that have been stored, are used as reference points.

14. Method according to claim 1, in which input quantities are (a) the measured values and (b) the corresponding times at which the measurements were taken.

15. Method for operation of a photovoltaic power plant with error monitoring, comprising:

checking detected errors via the method according to claim 1, and suppressing the error message in the presence of the temporary light obstruction.

16. Method according to claim 15, in which the measured values are checked for plausibility.

17. Method according to claim 15, in which the measured values result from measurements of the string currents of the strings.

18. Method according to claim 17, in which the light obstruction of a certain string is present for a certain solar altitude range if the stored ratio for this range deviates from the expected ratio.

19. Method according to claim 15, in which the calculating of the current ratio includes comparing the first currently measured value with a target value or threshold value.

20. Method according to claim 15, in which for determining the expected ratio a selection of the at least maximal values of the measured values, that have been stored, are used as reference points.

\* \* \* \* \*